(12) United States Patent
Zhou

(10) Patent No.: US 8,494,238 B2
(45) Date of Patent: Jul. 23, 2013

(54) REDUNDANT SPATIAL ENSEMBLE FOR COMPUTER-AIDED DETECTION AND IMAGE UNDERSTANDING

(75) Inventor: Xiang Sean Zhou, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 307 days.

(21) Appl. No.: 13/033,886

(22) Filed: Feb. 24, 2011

(65) Prior Publication Data

US 2011/0188706 A1 Aug. 4, 2011

Related U.S. Application Data

(63) Continuation-in-part of application No. 12/787,916, filed on May 26, 2010, now Pat. No. 8,369,593, and a continuation-in-part of application No. 12/334,898, filed on Dec. 15, 2008, now Pat. No. 8,160,341.

(60) Provisional application No. 61/307,596, filed on Feb. 24, 2010, provisional application No. 61/181,035, filed on May 26, 2009, provisional application No. 61/016,313, filed on Dec. 21, 2007.

(51) Int. Cl.
*G06K 9/00* (2006.01)
(52) U.S. Cl.
USPC ........................................................ 382/128
(58) Field of Classification Search
USPC ....... 382/128–134; 128/920–925; 356/39–49; 600/407–414, 424–426; 345/581–618
See application file for complete search history.

(56) References Cited

U.S. PATENT DOCUMENTS

| 6,674,883 | B1 | 1/2004 | Wei et al. | |
|---|---|---|---|---|
| 8,300,927 | B2* | 10/2012 | Yang et al. | 382/164 |
| 2003/0190091 | A1* | 10/2003 | Stewart et al. | 382/294 |
| 2004/0066966 | A1* | 4/2004 | Schneiderman | 382/159 |
| 2008/0253631 | A1* | 10/2008 | Oosawa | 382/128 |
| 2008/0304714 | A1* | 12/2008 | Lu et al. | 382/118 |
| 2009/0097739 | A1* | 4/2009 | Rao et al. | 382/159 |
| 2009/0154785 | A1* | 6/2009 | Lynch et al. | 382/131 |
| 2009/0161937 | A1 | 6/2009 | Peng et al. | |
| 2010/0284590 | A1 | 11/2010 | Peng et al. | |

OTHER PUBLICATIONS

D. Cristinacce and T. Cootes, "Facial feature detection using adaboost with shape constraints", in 14th British Machine Vision Conference, 2003, pp. 231-240.
S. Agarwal, et al., "Learning to detect objects in images via a sparse, part-based representation", IEEE Trans. Pattern Anal. Machine Intell., vol. 26, No. 11, pp. 1475-1490, 2004.

(Continued)

*Primary Examiner* — Atiba O Fitzpatrick
(74) *Attorney, Agent, or Firm* — Peter Withstandley

(57) ABSTRACT

Described herein is a technology for facilitating computer-aided detection and image understanding. In one implementation, an input set of training images of a target structure, such as an anatomical structure, is received. The input set of training images is spatially realigned to different landmarks to generate multiple bags of training images. At least one of the multiple bags comprises substantially all the training images in the input set, but realigned to a landmark. The multiple bags of training images may be used to train a spatial ensemble of detectors, which can be employed to generate an output result by automatically detecting a target structure in an input image.

19 Claims, 11 Drawing Sheets

OTHER PUBLICATIONS

T.K. Leung, et al., "Finding faces in cluttered scenes using random labeled graph matching", in Proc. Intl. conf. on Computer Vision, Cambridge, MA, 1995, pp. 637-644.

A. Mohan, et al., "Example-based object detection in images by components" IEEE Trans. Pattern Anal. Machine Intell., vol. 23, No. 4, pp. 349-361, 2001.

H. Barlow, "Sensory mechanisms, the reduction of redundancy and intelligence", The mechanisation of thought processes, pp. 535-539, 1959.

D. Field, "Relations between the statistics of natural images and the response properties of cortical cells", Journal of the Optical Society of America A, vol. 4, No. 12, pp. 2379-2394, 1987.

N. Sutherland, "Outlines of a theory of visual Pattern Recog. in animals and man", Proc. Royal Society of London. Series B, Biological Sciences, vol. 171, No. 1024, pp. 297-317, 1968.

I. Biederman, "Recognition-by-components: A theory of human image understanding" Psychological review, vol. 94, No. 2, pp. 115-147, 1987.

H. Müller, et al., "A review of content-based image retrieval systems in medical applications—clinical benefits and future directions", Int'l J. of Medical Informatics, vol. 73, No. 1, pp. 1-23, 2004.

X. Zhou et al., Semantics and CBIR: a medical imaging perspective, in Proc. Int'l Conf. Content-based Image and Video Retrieval, 2008, pp. 571-580.

J. Yang and J. Duncan, "Joint prior models of neighboring objects for 3D image segmentation", in Proc. IEEE Conf. on Computer Vision and Pattern Recog., Washington, DC, vol. 1, 2004.

N.F. Noy and D.L. Rubin,, "Translating the Foundational Model of Anatomy into OWL", in Stanford Medical Informatics Technical Report, 2007.

L. Breiman, "Bagging predictors", Machine Learning, vol. 24, pp. 123-140, 1996.

J. Yang, et al., "Evaluating bag-of-visual-words representations in scene classification", in Proc. Int'l Workshop on Multimedia Information Retrieval, 2007, p. 206.

S. Vucetic, et al., "A data partitioning scheme for spatial regression" in Proc. IEEE/INNS Int'l Jnt Conf. Neural Networks, 1999.

K. Yow and R. Cipolla, "Feature-based human face detection", Image and Vision Computing, vol. 15, No. 9, pp. 713-735, 1997.

B. Leibe, et al., "Robust object detection with interleaved categorization and segmentation", Int'l J. of Computer Vision, vol. 77, No. 1, pp. 259-289, 2008.

P. Viola and M. Jones, "Rapid object detection using a boosted cascade of simple features", in Proc. IEEE Conf. on Computer Vision and Pattern Recog., Hawaii, vol. 1, 2001, pp. 511-518.

B. Georgescu, et al., "Database-guided segmentation of anatomical structures with complex appearance", in Proc. IEEE Conf. on Computer Vision and Pattern Recog., San Diego, CA, 2005, pp. II: 429-436.

Y. Zheng, et al., "Robust object detection using marginal space learning and ranking-based multi-detector aggregation", in Proc. IEEE Conf. on Computer Vision and Pattern Recog., Miami, FL, 2009.

M. Ozuysal et al., "Fast keypoint recognition in ten lines of code", i Proc. IEEE Conf. on Computer Vision and pattern Recog., Minneapolis, MN, vol. 1, 2007, pp. 1-8.

V. Lepetit and P. Fua, "Keypoint recognition using randomized trees", IEEE Trans. Pattern Anal. Machine Intell., vol. 28, No. 9, p. 1465, 2006.

Z. Peng, et al., "Robust anatomy detection from CT topograms" in Proc. SPIE Medical Imaging, vol. 7620, 2009, pp. 1-8.

T Cootes, G. Edwards, C. Taylor et al., "Active appearance models", IEEE Trans. Pattern Anal Machine Intell., vol. 23, No. 6, pp. 681-685, 2001.

J.M. Boone, et al., "Automated Recognition of Lateral From PA chest radiographs: saving seconds in a PACS environment", Journal of Digital Imaging, vol. 16, No. 4, pp. 345-349, 2003.

T.M. Lehmann et al., "Determining the view of chest radiographs", Journal of Digital Imaging, vol. 16, No. 3, pp. 280-291, 2003.

E. Kao, et al., "Projection profile analysis for identifying different views of chest radiographs", Academic Radiology, vol. 13, No. 4, pp. 518-525, 2006.

T. Deselaers and H. Ney, "Deformations, patches, and discriminative models for automatic annotation of medical radiographs", Pattern Recog. Letters, vol. 29, No. 15, pp. 2003-2010, 2008.

T. Tommasi, F. Orabona, and B. Caputo, "Discriminative cute integration for medical image annotation", Pattern Recog. Letters, vol. 29, No. 15, pp. 1996-2002, 2008.

Mougiakakou et al., "Differential diagnosis of CT focal liver lesions using texture features, feature selection and ensemble driven classifiers", Artificial Intellegence in Medicine, Elsevier, NL, vol. 41, No. 1, Aug. 29, 2007, pp. 25-37.

Kalker et al., "Cardiac Image Segmentation for Contrast Agent Videodensitometry", IEEE Transactions on Biomedical Engineering, IEEE Service Center, Piscataway, NJ, vol. 52, No. 2, Feb. 1, 2005, pp. 277-286.

Zhou et al., "Redundancy, Redundancy, Redundancy: The Three Keys to Highly Robus Anatomical Parsing in Medical Images", MIR'10, Mar. 29-31, 2010, Philadelphia, Pennsylvania, USA, 10 pages.

* cited by examiner

|   | P | N |
|---|---|---|
| $\tilde{P}$ | TP | FP |
| $\tilde{N}$ | FN | TN |

502

|   | TP | FP | TN | FN |
|---|---|---|---|---|
| $\mathcal{E}(TP)$ | $n_1$ | $n_5$ | - | - |
| $\mathcal{E}(FP)$ | $n_6$ | $n_2$ | - | - |
| $\mathcal{E}(TN)$ | - | - | $n_3$ | $n_7$ |
| $\mathcal{E}(FN)$ | - | - | $n_8$ | $n_4$ |

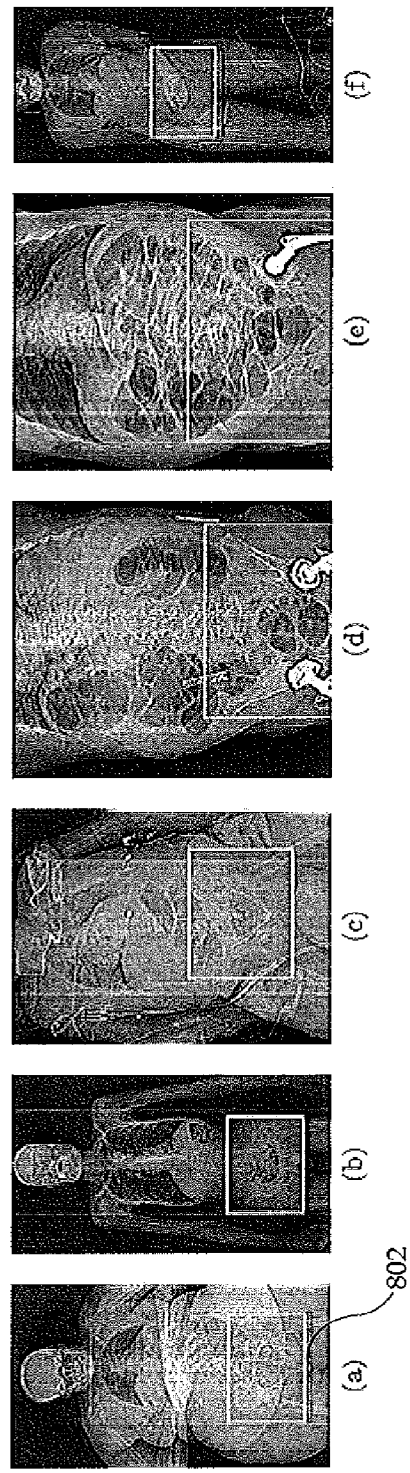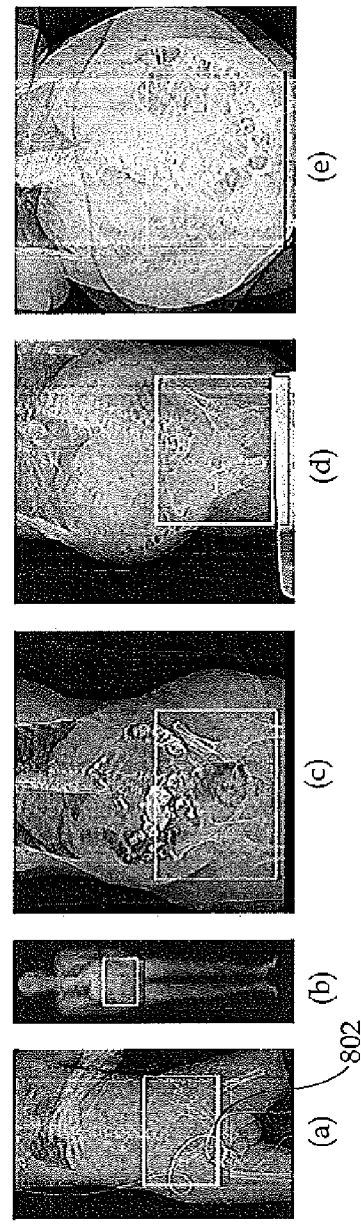
Fig. 8
Fig. 9

Table 1: PA-AP/LAT/OTHER performance.

| [ref] | Method | PA-AP/LAT | PA-AP/LAT/OTHER |
|---|---|---|---|
| - | Our method | - | 98.81% |
| - | Our method w/o FP reduction | 99.98% | 98.47% |
| [27] | Lehmann's method | 99.04% | 96.18% |
| [26] | Boone's method | 98.24% | - |
| [28] | Improved Projection Profile | 97.60% | - |

Table 2: Multi-class performance.

| [ref] | Method | Multi-class w/o OTHER | Multi-class w/ OTHER |
|---|---|---|---|
| - | Our method | 99.33% | 98.81% |
| - | Subimage pixel intensity + SVM | 97.33% | 89.00% |
| [29] | PatchBOW + SVM | 96.89% | 94.71% |
| [30] | SIFTBOW + SVM | 98.89% | 95.86% |

REDUNDANT SPATIAL ENSEMBLE FOR COMPUTER-AIDED DETECTION AND IMAGE UNDERSTANDING

CROSS-REFERENCE TO RELATED APPLICATIONS

The present application claims the benefit of U.S. provisional application Ser. No. 61/307,596, filed Feb. 24, 2010, the entire contents of which are herein incorporated by reference.

Additionally, the present application is a continuation-in-part application of U.S. patent application Ser. No. 12/787,916, filed May 26, 2010, which claims the benefit of U.S. provisional patent application Ser. No. 61/181,035, filed May 26, 2009 and is a continuation-in-part application of U.S. patent application Ser. No. 12/334,898, filed Dec. 15, 2008, which claims the benefit of U.S. provisional application Ser. No. 61/016,313, filed Dec. 21, 2007, which applications are hereby incorporated herein by reference in their entirety.

TECHNICAL FIELD

The present disclosure relates generally to automated or partially-automated computer aided detection, and more particularly to computer-aided detection based on redundant information collected by a spatial ensemble.

BACKGROUND

The field of medical imaging has seen significant advances since the time X-Rays were first used to determine anatomical abnormalities. Medical imaging hardware has progressed in the form of newer machines such as Medical Resonance Imaging (MRI) scanners, Computed Axial Tomography (CAT) scanners, etc. Because of large amount of image data generated by such modern medical scanners, there has been and remains a need for developing image processing techniques that can automate some or all of the processes to determine the presence of anatomical abnormalities in scanned medical images.

Digital medical images are constructed using raw image data obtained from a scanner, for example, a CAT scanner, MRI, etc. Digital medical images are typically either a two-dimensional ("2-D") image made of pixel elements or a three-dimensional ("3-D") image made of volume elements ("voxels"). Four-dimensional (4-D) medical images containing information of 3-D volumes moving in time are also known. Such 2-D, 3-D or 4-D images are processed using medical image recognition techniques to determine the presence of anatomical structures (e.g., lung, heart, head, chest, etc.) or abnormalities (e.g., lesions, cysts, tumors, polyps, etc).

Traditionally, Computer-Aided Detection (CAD) refers to automatic image processing and recognition of abnormal (or diseased) tissues or structures within a medical image. However, in a broader sense and as used herein, "CAD" can also be used to refer to the detection of both abnormal and normal structures. In this sense, it becomes more related to the general research topic of computer vision and image understanding. The CAD system may process medical images, identify and/or tag anatomical structures or possible abnormalities for further processing or review. Given the amount of image data generated by any given image scan, it is preferable that an automatic technique should point out, or align to, anatomical features (e.g., pelvis, heart, liver, knee meniscus, etc.) in the selected regions of an image to a doctor for easier visualization and accelerated diagnosis of any disease or condition.

There have been significant advances in the research field of general-purpose object detection and pattern recognition in images. However, image understanding algorithms that work well with natural images may not work robustly enough with medical images. This is mainly because medical images exhibit strong variability, where anomaly is a norm. The strong variability in medical images may be the result of for example, severe diseases, fatty tissue, deformity, implants, imaging artifacts, occlusions, missing data, abnormal field-of-view during image acquisition, and so forth. Conventional methods are unable to provide the level of robustness in the presence of such strong variability in the images.

Another challenge involves the particularly stringent requirements for robustness and accuracy in clinical use applications. For example, in radiological imaging, it is desirable to minimize the time and area of exposure of the patient to potentially harmful radiation. A bigger-than-necessary scanning field may result in more harm to the patient due to exposure to added radiation, and images with lower voxel resolution. On the other hand, if the scanning field is smaller-than-necessary, there is a risk of missing pertinent structural data, which may prompt the need for a re-scan, thereby resulting in waste of time and potentially more exposure to radiation. It is therefore important to accurately and robustly identify the scanning field so that the resulting images capture the desired target structure. The more precise the scanning field, the faster the data acquisition can be performed and the lesser the subject is exposed to potentially harmful radiation.

Accordingly, it would be desirable to provide improved systems and methods to facilitate robust computer-aided detection and image understanding.

SUMMARY

A technology for facilitating computer-aided detection and image understanding is described herein. In one implementation, an input set of training images of a target structure, such as an anatomical structure, is received. The input set of training images is spatially realigned to different landmarks to generate multiple bags of training images. At least one of the multiple bags comprises substantially all the training images in the input set, but realigned to a landmark. The multiple bags of training images may be used to train a spatial ensemble of detectors, which can be employed to generate an output result by automatically detecting a target structure in an input image.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

FIG. 5b shows a typical confusion matrix and an exemplary reliability confusion matrix;

FIGS. 8(a)-(f) and 9(a)-(e) show exemplary detection results for pelvis scan ranges;

FIG. 13 shows an exemplary comparison between the recognition rates of the present method with other methods.

DETAILED DESCRIPTION

Figure 1:
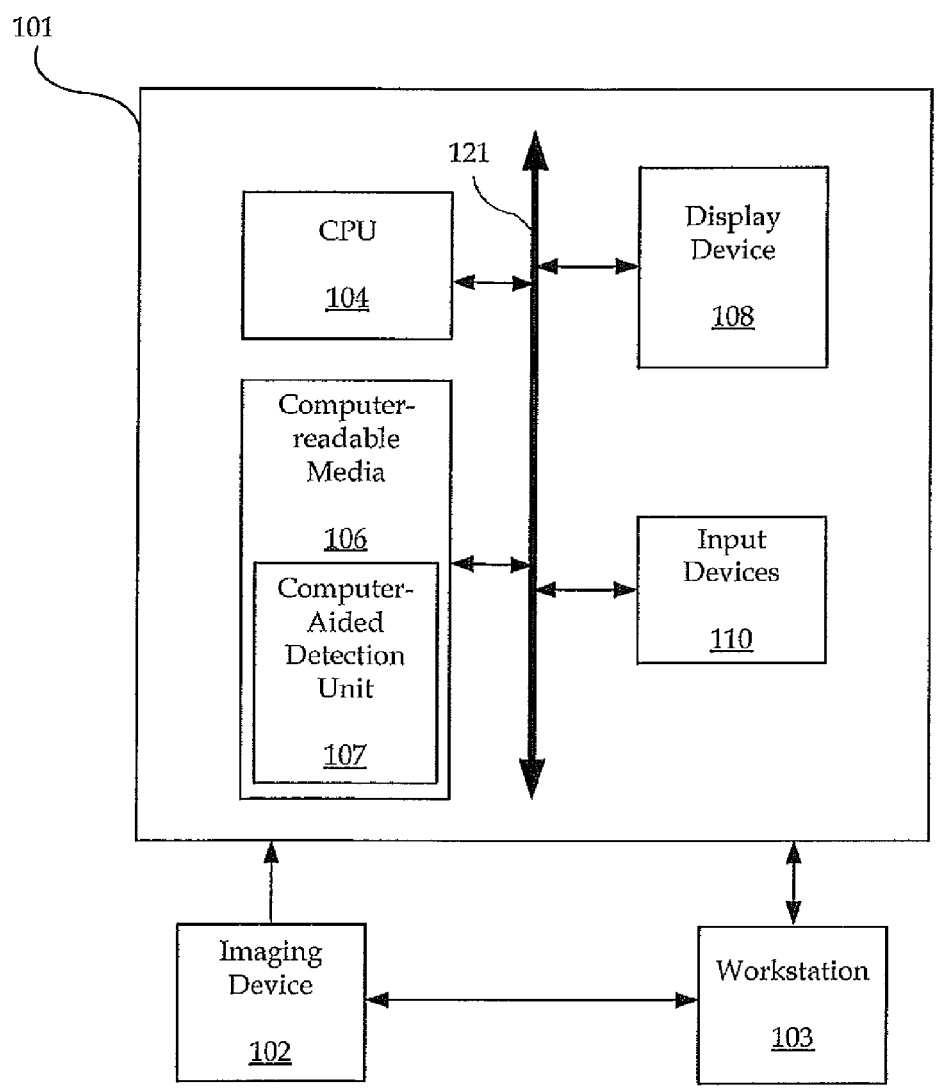
FIG. 1 is a block diagram illustrating an exemplary system.

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of a radiosurgery or radiotherapy procedure, which may include times when the radiation source is either on or off. From time to time, for convenience of description, CT imaging data may be used herein as an exemplary imaging modality. It will be appreciated, however, that data from any type of imaging modality including but not limited to X-Ray radiographs, MRI, CT, PET (positron emission tomography), PET-CT, SPECT, SPECT-CT, MR-PET, 3D ultrasound images or the like may also be used in various embodiments of the invention.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulate and transform data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

As used herein, the term "image" refers to multi-dimensional data composed of discrete image elements (e.g., pixels for 2D images and voxels for 3D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to $R$ or $R^7$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The following description sets forth one or more implementations of systems and methods that facilitate redundant spatial ensemble-based computer-aided detection and image understanding. High robustness and reliability in visual understanding are achieved by exploiting redundancies to resolve uncertainty, ambiguity or contradiction. This approach is particularly useful for medical images, due to the constrained nature of the imaging process and availability of statistical redundancies in such images. One implementation of the present framework exploits statistical redundancies in image data to automatically detect or recognize target structures with less parameter tuning and high robustness. A spatial ensemble method is used to collect more-than-necessary amount of evidences, not only on and/or around the target structure to be detected, but also a distance away from the target structure. The evidences are combined using, for example, a voting method constrained by spatial configuration models.

More particularly, the spatial ensemble method realigns the input training images to different landmarks to generate multiple bags of training images. It is advantageous to use a large (i.e., more-than-necessary) number of bags of images to achieve statistical redundancy, which leads to higher robustness and reliability. More number of bags may bring in more errors as well; therefore, additional processing steps can be employed to filter out errors and outliers in the detection results based on the multiple training bags. Furthermore, one can predict the target structure from each, or various combinations, of the detectors, and combine the prediction in a robust way to formulate the final output. One implementation of the present framework focuses on automatic detection and tagging of anatomical structures (which can be normal or abnormal), instead of detection of diseases. This can facilitate intelligent target localization during radiology scans, as well as other clinical applications, such as image matching and retrieval, workflow improvement associated with the Picture Archiving and Communication Systems (PACS), or selective preprocessing for traditional CAD algorithms. Finally, due to the large number of redundant evidences, a reliability measure that represents the present framework's self-assessment of performance can be derived and presented to, for example, the human user so as to enhance user experience.

It has been shown that the present framework significantly outperformed conventional methods by exploiting redundancy at one or more levels, such as part-whole relations level, the anatomical constraint level, and the scale space level. For example, with respect to redundancy in part-whole relations, a subset of parts may be used to reveal the whole. In medical imaging, the subset can be even smaller due to well-defined imaging protocols and strong prior knowledge. The extent of an anatomical structure (e.g., pelvic bone) may be determined by using sufficient evidences of its parts within the image. Even if a disease or imaging artifact alters the anatomical structure, the remaining portions of the structure or neighboring structures may be used to determine its existence and extent.

Furthermore, there are "long-range" or "distant" relationships (or constraints) that may be exploited, all the way from head to toe, which provide strong redundancy information for anatomical modeling. For instance, kidneys do not exist in a head and neck scan; and in a whole body scan, the pelvis is always below the lung in a predictable way, at least in a DICOM world (see, for example, http://medical.nema.org/). These are just simple examples of a very rich set of anatomical constraints that can be exploited to derive simple statistical models and improve reliability.

Additionally, scale space redundancy information may also be used to improve the robustness of target localization. In the space of medical images, for example, most anatomical structures appear in a predictable context at a coarser scale: the aortic arch, or a smaller structure such as the carina of trachea (i.e., the bifurcation of the airway), appears almost always roughly in the middle of the two lungs. The inverse is also true, i.e., that a large organ or structure may distinguish itself only by fine details. A good example is the two adjacent vertebrae: thoracic T12 and the lumbar L1, which can be differentiated only by a small difference in shape and connectivity to ribs on the backside. Cross-scale support is available for most (if not all) human anatomical structures.

In one implementation, a spatial ensemble of detectors is learned by re-aligning training data to different landmarks or parts of the whole target structure. The spatial ensemble collects all, or as much as possible, contextual evidence from various parts of the training images for facilitating robust detection. In addition, the detectors may be trained at multiple scales, ranging from a coarse level to a fine level, to exploit cross-scale redundancies. Even further, the reliability of the present framework may be reported and/or presented by generating a measure of reliability of the output result. These and other exemplary features of the present framework will be described in more detail in the following description.

FIG. 1 is a block diagram illustrating an exemplary system 100. The system 100 includes a computer system 101 for implementing the framework as described herein. The computer system 101 may be further connected to an imaging device 102 and a workstation 103, over a wired or wireless network. The imaging device 102 may be a radiology scanner, such as a magnetic resonance (MR) scanner or a CT scanner, for acquiring image data.

The computer system 101 may be a desktop personal computer, a portable laptop computer, another portable device, a mini-computer, a mainframe computer, a server, a storage system, a dedicated digital appliance, or another device having a storage sub-system configured to store a collection of digital data items. In one implementation, computer system 101 comprises a processor or central processing unit (CPU) 104 coupled to one or more non-transitory computer-readable media 106 (e.g., computer storage or memory), display device 108 (e.g., monitor) and various input devices 110 (e.g., mouse or keyboard) via an input-output interface 121. Computer system 101 may further include support circuits such as a cache, power supply, clock circuits and a communications bus.

It is to be understood that the present technology may be implemented in various forms of hardware, software, firmware, special purpose processors, or a combination thereof. In one implementation, the techniques described herein may be implemented as computer-readable program code tangibly embodied in non-transitory computer-readable media 106. In particular, the techniques described herein may be implemented by computer-aided detection (CAD) unit 107. Non-transitory computer-readable media 106 may include random access memory (RAM), read only memory (ROM), magnetic floppy disk, flash memory, and other types of memories, or a combination thereof. The computer-readable program code is executed by CPU 104 to process images (e.g., MR or CT images) from imaging device 102 (e.g., MR or CT scanner). As such, the computer system 101 is a general-purpose computer system that becomes a specific purpose computer system when executing the computer readable program code. The computer-readable program code is not intended to be limited to any particular programming language and implementation thereof. It will be appreciated that a variety of programming languages and coding thereof may be used to implement the teachings of the disclosure contained herein.

In one implementation, the computer system 101 also includes an operating system and microinstruction code. The various techniques described herein may be implemented either as part of the microinstruction code or as part of an application program or software product, or a combination thereof; which is executed via the operating system. Various other peripheral devices, such as additional data storage devices and printing devices, may be connected to the computer system 101.

The workstation 103 may include a computer and appropriate peripherals, such as a keyboard and a display device, and can be operated in conjunction with the entire CAD system 100. For example, the workstation 103 may communicate with the imaging device 102 so that the image data collected by the imaging device 102 can be rendered at the workstation 103 and viewed on the display device. The workstation 103 may include a user interface that allows the radiologist or any other skilled user (e.g., physician, technician, operator, scientist, etc.), to manipulate the image data. Further, the workstation 103 may communicate directly with the computer system 101 to display processed image data and/or output prediction results.

Figure 2:
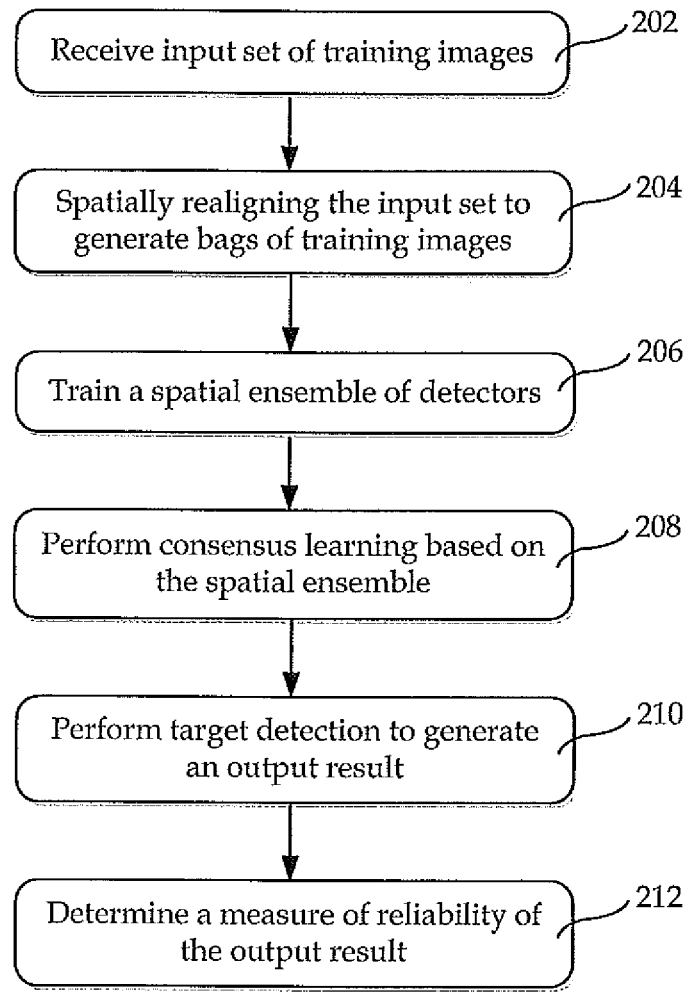
FIG. 2 shows an exemplary method.

FIG. 2 shows an exemplary method 200, which exploits redundancies to achieve human-like or better-than-human robustness in detecting target structures in image data. The exemplary method 200 may be implemented by the CAD unit 107 in the computer system 101 previously described with reference to FIG. 1. It should be noted that in the discussion of FIG. 2 and subsequent figures, continuing reference may be made to elements and reference numerals shown in FIG. 1.

At step 202, the computer system 101 receives an input set of training images. The training images may include images of a target structure, such as an anatomical structure (e.g., pelvis, thorax, heart, abdomen, head, spine, etc.). The images may be acquired by, for example, imaging device 102, using techniques that include, but are not limited to, magnetic resonance (MR) imaging, computed tomography (CT), helical CT, x-ray, positron emission tomography, fluoroscopic, ultrasound or single photon emission computed tomography (SPECT). The images may be binary (e.g., black and white) or grayscale. Additionally, the images may comprise two dimensions, three dimensions, four dimensions or any other dimensionality.

In one implementation, the images are pre-processed, either automatically by the computer system 101, manually by a skilled user (e.g., radiologist), or a combination thereof. Various types of pre-processing may be performed. For example, anatomical features (or landmarks) in the images may be segmented, tagged, annotated or marked for emphasis. In one implementation, the features are automatically detected by the computer system 101 using a CAD technique, such as one that detects points where the change in intensity exceeds a certain threshold. Alternatively, features may be manually identified by a skilled user via, for example, a user-interface at the workstation 103.

At 204, the input set of training images is spatially realigned to different landmarks to generate multiple bags of training images. A "bag," as used herein, generally refers to a set of bootstrap samples that can be used for training a detector. In one implementation, at least one of the multiple bags includes substantially all the training images in the input set realigned to at least one particular landmark. Unlike existing ensemble methods that make redundant use of the training set by re-sampling with replacement and using a small subset of training images in each bag, the present framework makes redundant use of the input training images in a spatial manner. In other words, substantially all training images are re-used in each bag to train a detector, but each time with re-alignment to a different landmark (or correspondence point) or a part of the whole target structure.

A landmark is an easily identifiable feature point, such as the tip of a bony structure. The landmark may be manually annotated or "fuzzily" defined, such as a point on a line/surface or in a texture-less region (e.g., center of the liver). Anatomical knowledge representations, such as Foundational Model of Anatomy (FMA), may also be used to guide the annotations. See, for example, X. Zhou, S. Zillner, M. Moeller, M. Sintek, Y. Zhan, A. Krishnan, and A. Gupta, "Semantics and CBIR: a medical imaging perspective," *Proc. Int'l Conf, Content-based Image and Video Retrieval*, 2008, pp. 571-580, which is herein incorporated by reference. The relationships between these landmarks may be represented by one or more sparse configuration models, which will be described in further detail later.

To generate the spatial ensemble, bootstrap aggregating (or bagging) may be used. The bagging predictor can then be constructed using averaging or voting, etc. For example, given a training set $L=\{(y_n, x_n), n=1, \ldots, N\}$, where $y_n$ denotes the class labels and $x_n$ denotes the inputs, a learning algorithm may use this training set to form a bagging predictor $\phi_B(x)$ as follows:

$$\phi_B(x) = av_B \phi(x, L^{(B)}) \quad (1)$$

where $L^{(B)}$'s are the bootstrap samples or bags, and $av_B$ denotes averaging or voting among the predictors.

For learning visual patterns, where x is an image (or a volume), the bootstrapping may be performed in the spatial domain, with each bag using substantially all the training images in the input set, but re-aligned to a different part of the target pattern or landmark. Denoting the re-alignment process of the training set as $A_i \otimes L$, with $A_i$ representing the i-th alignment parameters and $\otimes$ the alignment operator, the formulation for the bagging predictor $\phi_A(x)$ becomes:

$$\phi_A(x) = vote_i \phi(x, A_i \otimes L) \quad (2)$$

wherein the number of re-alignments $|A| \geq n$, and n is a minimum number of landmarks required for determining a presence, location, size, and/or orientation of the target structure. In one implementation, much more than n bags of training images are generated (i.e. $|A| \gg n$) so as to achieve higher statistical redundancy and thus robustness.

Figure 3:
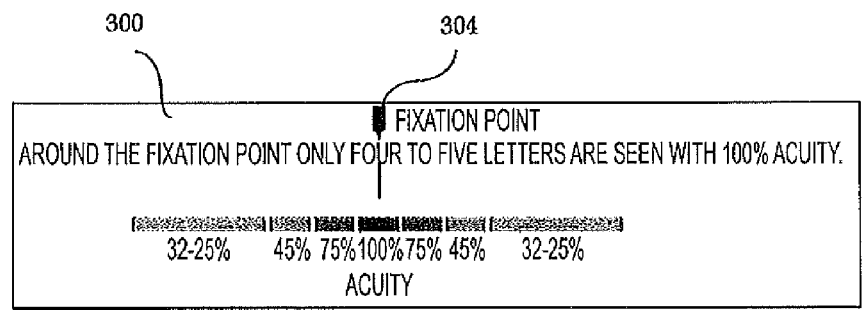
FIG. 3 shows an exemplary representation of human foveal vision.

The realignment of evidences to different spatial landmarks is similar to human foveal vision where multiple examinations are performed at many focal points with peripheral context. For example, FIG. 3 shows an exemplary representation 300 of human foveal vision. At any given time point, only a small neighborhood 302 near the fixation point 304 is in focus while the peripheral context is blurred. The spatial ensemble in accordance with the present framework somewhat resembles the human foveal vision system, by making repeated examinations of the same scene with different focus points. Repeated examinations of multiple focal points in the scene eventually arrive at, and confirm, a consensus recognition.

Figure 4:
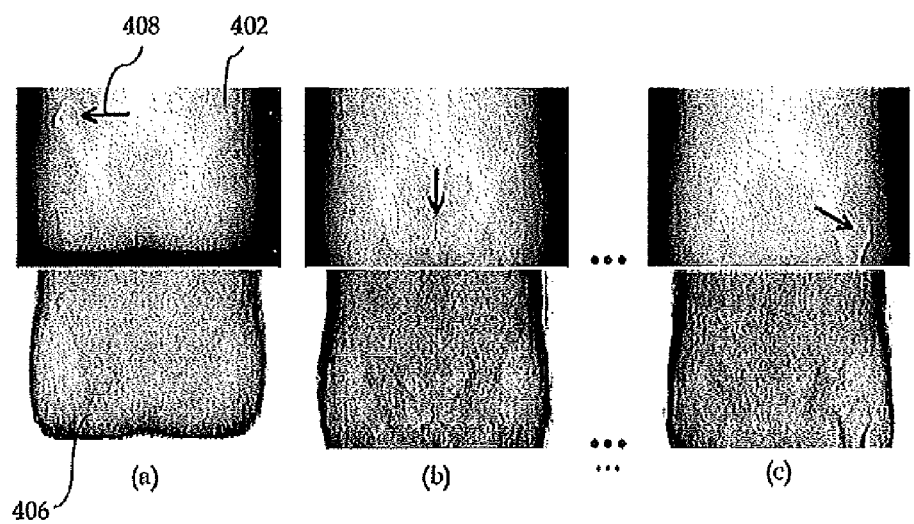
FIGS. 4(a)-(c) show exemplary statistical representations of multiple foveal evidences around a pelvis.

FIGS. 4(a)-(c) show exemplary medians of some of the re-aligned bags based on landmarks around the pelvis. In particular, the top row 402 shows the medians of the re-aligned training images, while the bottom row 406 shows the corresponding median absolution deviations (MADs). The arrows 408 indicate the points of computational foveal fixation determined by spatially re-aligning the training set.

Referring back to FIG. 2, at 206, a spatial ensemble of detectors is generated using the bags of re-aligned training images. In one implementation, for each bag of training images, a separate foveal detector is trained in the form of a classifier Various machine learning methods may be used to generate the spatial ensemble of detectors, including but not limited to, AdaBoost-based or random forest/ferns learning methods.

At 208, consensus learning is performed using the spatial ensemble of detectors. Consensus learning combines outputs from the spatial ensemble of detectors to build a consensus (i.e. general agreement). Various types of consensus learning may be performed, depending on the use case. For example, to detect if a target structure (e.g., anatomical feature) is present in an image or to locate such target structure, a majority voting scheme or any other ensemble method may be performed to remove outliers. To determine the extent of the target structure, the remaining inlier detections may be used to predict the optimal output. See, for example, Z. Peng, Y. Zhan, X. S. Zhou, and A. Krishnan, "Robust anatomy detection from CT topograms," *Proc. SPIE Medical Imaging*, vol. 7620, 2009, pp. 1-8, which is herein incorporated by reference.

Additionally, to robustly detect any outliers or remove potential error detections, a sparse voting scheme may be implemented to generate one or more sparse configuration models. While the previous step 206 detects each of the multiple, potentially redundant, evidences independently, step 208 seeks to model and exploit dependencies among these individual detections in order to identify or remove possible error detections. To generate the sparse configuration models, conditional probabilities of the detectors may first be determined. More particularly, assuming the conditional probability of an annotated landmark (or evidence) $p_i$ given other landmarks is denoted as $P(p_i | P_{\bar{i}})$, and if all the probabilities $p_j$ in the set $P_{\bar{i}}$ are correct, these probabilities may be used to measure the quality of the evidence. Since it is not known which of the probabilities $p_j$ are erroneous, a random sample consensus (RANSAC)-type strategy may be used to sample many subsets of landmarks and detect the outliers from the samples. Alternatively, an exhaustive sampling method may be employed, if time or computational resources permit.

To address the potential challenge that the majority portion of the target structure (or anatomical pattern) may be missing, occluded or altered by disease or artifacts (see, for example, FIGS. 10-11) in the images, small or sparse sets $P_i$'s may be used. In other words, a landmark point may be judged by only a small subset of other landmark points every time. For instance, a pair or triple of landmark points may be used to form a voting group and construct predictors only among themselves. This kind of sparsity and "democracy" aggregation of many small/sparse decisions) has at least two advantages: (1) a decision may be made even if only a scarce set of evidences is available; and (2) the final decision is robust to potentially high percentage of erroneous detections, as long as they are inconsistent with one another.

In one implementation, the vote received by a landmark point $p_i$ is denoted by $\eta$ ($p_i|P_v$), where $P_v$ is a voting group. The vote is defined as $p_i$'s likelihood of being accepted or predicted by $P_v$ based on the conditional distribution estimated using the annotated training set. Assuming Gaussianity with mean $v_i$ and covariance $\Sigma$, the vote may be expressed as:

$$\eta(p_i \mid P_v) = \frac{1}{(2\pi)^{D/2}|\Sigma|^{1/2}} e^{-(p_i-v_i)^T \Sigma^{-1} (p_i-v_i)} \tag{3}$$

where $D \in \{2, 3\}$ is the dimensionality of the image.

The collection of all voting groups is an overly redundant representation of the spatial relationship between parts of an anatomical structure. High robustness can be achieved because even if severe diseases affect many landmarks, thereby causing wrong or missed detections, consensus may still be formed by the remaining landmarks. The sparse configuration modeling may be applied not only on or around the target structure, but also on distal organs and/or structures away from the target structure, whenever present in the image. This exploits the redundancy in anatomical constraints and may further improve the robustness. For example, when accidental findings of pelvic evidence occur in the upper part of the torso, the consensus among the thoracic foveal evidences and their joint vetoes against such accidental false findings can quickly remove them.

Additionally, redundancy may be exploited in the scale space. More particularly, a multi-scale approach may be adopted for detecting landmarks, while taking into account the trade-off between efficiency and robustness. Detectors may be implemented in multiple scales ranging from a coarse level to a fine level, while minimizing the dependencies between the fine-level detectors and the coarse-level detectors. The search range may be as wide as allowable by the speed requirement. For example, a coarse level detector of carina may "see" the lungs and thus predict the location of carina, but such a prediction is largely disregarded by the finer level detectors, which will re-search for the carina in a wide search space. Such loose dependency introduces added redundancy in the scale space and performs more robustly when abnormal cases are encountered.

Referring to FIG. 2, at 210, the target detection is performed based on the learned spatial ensemble of detectors and/or configuration models to generate an output result. The target detection may include pattern localization, which seeks to predict not only the presence, but the location, size, or orientation, of the target object. The type of target detection depends on the use case or application. In one implementation, the learned detectors and/or configuration models are used to predict a presence, location, size or orientation of at least a portion of the target structure in an input image. Additionally, the target detection may involve predicting an imaging plane that is aligned for optimal visualization of at least a portion of the target structure in the input image. In another implementation, the learned detectors and/or configuration models are used to predict a two-dimensional or three-dimensional field of view (or scan range) for locating or imaging at least a portion of the target structure in the input image. The field of view may be either stationary or moving in time so as to align with any motion resulting from, for example, breathing or cardiac motion of the patient. In yet another implementation, the target detection includes classification and annotation (or labeling) of at least a portion of the target structure in the input image. It is understood that other use cases or applications may also be implemented.

Figure 5A:
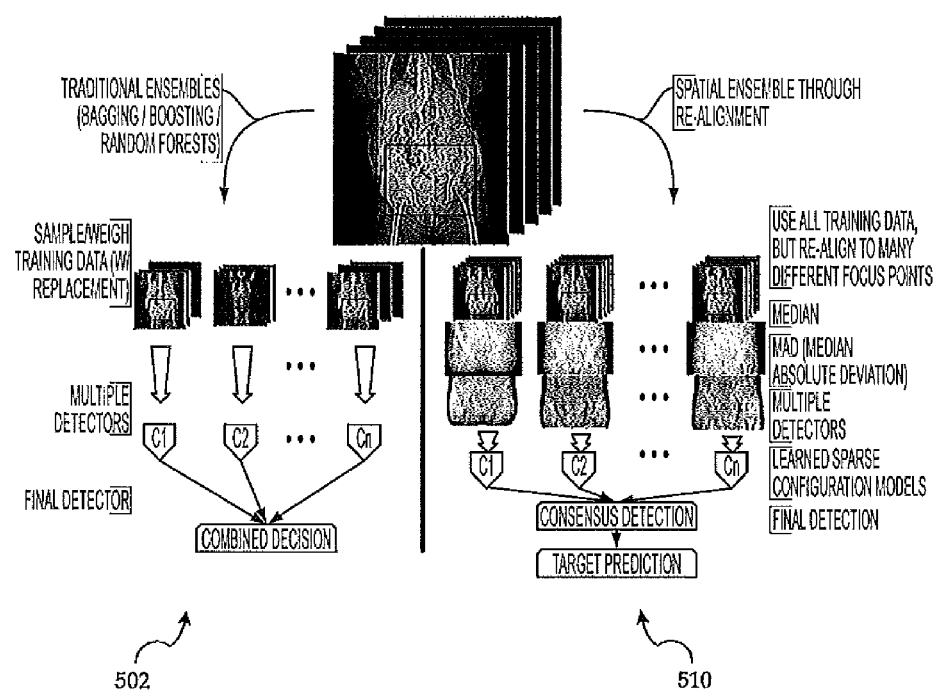
FIG. 5a shows a comparison between a traditional bagging method and an exemplary method.

FIG. 5a compares a conventional method 502 and an exemplary method 510 in accordance with the present framework. As shown, the exemplary method 510 generally involves generating a spatial ensemble through re-alignment. In particular, a redundant re-sampling of training images is performed at different focus points, with each bag re-using substantially all the images and all the context information available. Aside from differences in how the training set is re-used, there are additional processing steps for the exemplary method 510 at run time. The processing steps executed will depend on whether the final goal is a detection or a segmentation (of either bounding box or contour/surface) task.

Referring back to FIG. 2, at 212, a measure of reliability of the output result is determined for self-assessment by the computer system 101. Such reliability measure may be used to alert the user of any potential failure or error of at least one component of the computer system 101. To enhance user experience, the measure of reliability may be presented via, for example, a display device 108 at the computer system 101 or remotely at the client workstation 103. The measure of reliability may be presented in the form of a textual or graphical pop-up message that alerts the user when the pattern localization or detection algorithm implemented by the computer system 101 fails.

Ideally, the self-assessment should be based on new information beyond those already used for deriving the output result. This may not be possible in a classification setting with a fixed feature space, but for vision applications, new information can be extracted from the images. The self-assessment should be fed-back and fused with the original answer if possible (i.e. integrated assessment). This is, however, not always possible if, for example, an initial answer is required in a timely manner and its assessment can only be computed afterwards; or the assessment uses information from future cases or accumulated population statistics (i.e. postmortem assessment).

FIG. 5b shows a traditional confusion matrix 502 for actual and predicted positives P and $\tilde{P}$, and actual and predicted negatives N and $\tilde{N}$. Performance of the pattern localization or detection may be assessed in terms of sensitivity (S), specificity (C), and accuracy (A) defined as follows:

$$S=TP/(TP+FN), C=TN/(FP+TN), A=(TP+TN)/(P+N) \tag{4}$$

where TP and FN denote true positive and false negative respectively, and P=TP+FN and N=FP+TN.

FIG. 5b further shows an exemplary reliability confusion matrix 504 that may be constructed based on the actual performance and self-assessed performance, wherein the framework's self-assessments of the four output types are denoted as $\epsilon(TP)$, $\epsilon(FP)$, $\epsilon(TN)$ and $\epsilon(FP)$. Using the symbols in table 504, a reliability measure ($\Re$) may be defined as the ratio of the diagonal sum over the matrix sum, as follows:

$$\Re = \frac{\sum_{i=1}^{4} n_i}{\sum_{j=1}^{8} n_j} \quad (5)$$

With this formulation, all assessments are equal: a false alert (that labels a good output as bad) is equally bad as a missed error; and recognition of success is as good as a detection of failure. In addition, under integrated assessment, $n_2=n_6=0$. This is because if the pattern localization method discovers that an original answer "P̃" was actually a false positive, it will modify it to "Ñ". As a result, $n_2$ and $n_6$ will be lumped into $n_3$ and $n_7$. More precisely, $n_6$ will be lumped into $n_7$, $n_2$ will move into $n_3$ (for TN cases) or $n_7$ (for FN cases)—the last scenario is possible when, for example, a FP face detection on a tree trunk was discovered, but a real face existed in another part of the image. Going one step further, if the assessment of a FP case prompted the algorithm logic to select a new location as a positive return, $n_2$ will actually shift into $n_1$. In any case, $n_2$ will end up being zero. If no "leakage" from diagonal to off-diagonal occurs, the value for the reliability measure $\Re$ will stay the same. However, with post-mortem assessment, $n_2$ and $n_6$ can be non-zero.

In general, high $\Re$ does not necessarily mean high S, C, or A; and vice versa. A pattern localization algorithm may perform poorly, but achieve high reliability. For example, a bad algorithm for iris (or heart) localization with many misses (or FNs) may have a high reliability if a very good face (or lung) detector is employed as part of the self-assessment, i.e., the algorithm will know that many "Ñs" are "FNs" ($n_4$>>0). If $n_4$ dominates Equation 5, the reliability score will be high. Conversely, an overly cautious assessment module for a highly accurate algorithm may spew out many false alerts.

Assuming integrated assessment, for a pure two-class classification problem, $\Re$ =A. This is because the classifier will not report any $\epsilon(FP)$ or $\epsilon(FN)$, since it will have simply switched the class label for those cases, thus lumping $n_2$ into $n_3$, $n_6$ into $n_7$, $n_4$ into $n_1$, and $n_8$ into $n_5$. The reliability measure $\Re$ =$(n_1+n_3)/(n_1+n_5+n_3+n_7)$ reduces to the traditional accuracy measure A of Equation 4. In other words, what the algorithm knows can be fully integrated into its outputs. The reliability measure $\Re$ may not provide any new information. Similar can be said for multi-class classification. However, whenever the algorithm's knowledge (i.e., self-assessment) cannot be fully integrated into its output, the reliability score becomes meaningful and informative. This is the case for pattern localization: the algorithm may know that the heart should be in the image according to the scene context, but just could not locate it directly because of for example, diseases. In such case, knowing an error does not automatically correct it.

An algorithm can be made more reliable by reducing off-diagonal terms in table 504. Under integrated assessment, there should be no false positives ($n_5=0$) and false negatives are known from true negatives ($n_7=n_80$). More specifically, for a pure pattern localization problem (k □ {1}→no TNs→$n_3=n_7=n_80$), $\Re$ =100% ↔ FP rate=0. This is also true where the positive predictive value PPV=TP/(TP+FP) =100%. High reliability may be achieved by picking the operating point on the receiver operating curve (ROC) such that the FP-rate is as low as possible, while maintaining an acceptable level of accuracy A.

A reliability-demanding user may prefer, for example, a system with 0% FPs and 5% FNs than one with 2% FPs and 2% FNs, because the former system is mostly autonomous, while the latter requires continuous human supervision just to catch those 2% FPs. When pushed to the extreme, one reaches a trivial and "lazy" solution to achieve a zero FP rate (i.e. 100% reliability). The algorithm can just give up and alert the user that "I have failed to find the target" for all cases ($n_1=n_5=0$). However, this is of no practical interest because A=0. Furthermore, as mentioned earlier, TNs, although rare, do exist. An algorithm's ability to detect and recognize them may be very useful, especially if different handling were to be applied, such as customized logic in the host application or specific messages to the user. When a wrong body part or orientation is scanned, it may be important for the algorithm to recognize it and alert the user for correction, instead of a general fail-to-locate message or even worse, a false positive finding.

To validate the actual performance of the present framework, three real-world use cases involving CT, MRI, and radiographic images were implemented. FIGS. 6-12 illustrate the various exemplary use cases. It is understood that while particular applications or use cases are discussed, the present technology is not limited to the specific embodiments illustrated.

Figure 6:
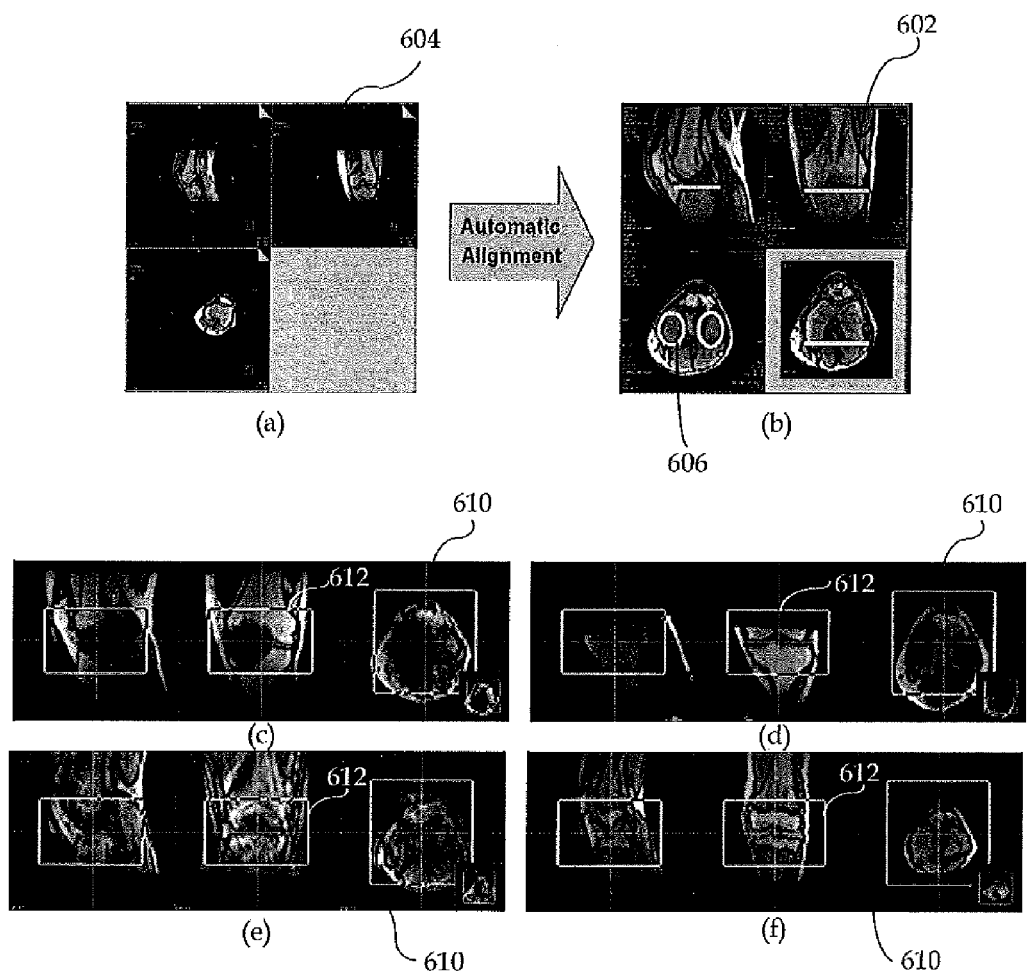
FIGS. 6-7 illustrate an exemplary use case in which the imaging plane is automatically detected.
Figure 7:
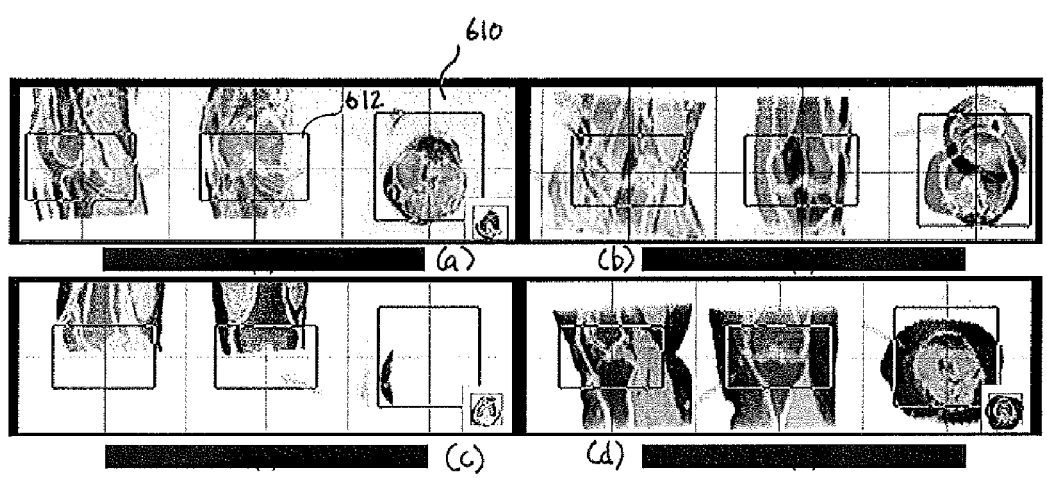

FIGS. 6-7 show an exemplary use case in which the imaging plane 602 is automatically detected. More particularly, FIG. 6(a) shows 3-D scout scan images 604 of a knee as training data, while FIG. 6(b) shows the desired output plane 602 and center 606 aligned for optimal imaging of the knee menisci. FIGS. 6(c)-(f) show images 610 with strong variability, such as images of knees with severe diseases or implants, imaging artifacts, occlusions, missing data, abnormal field-of-view during image acquisition, etc. The general goal was to automatically determine properly positioned, scaled, and/or oriented bounding boxes 612 around the knee portion (or the location and orientation of meniscus plane 602) for optimal visualization, even in the presence of strong variability.

A total of 744 consecutive cases were collected from a hospital as unseen test data. The present framework achieved an extremely low failure rate of 0.4%, compared to 15.2% of a predecessor method based on bone segmentation that did not exploit any redundancies. In addition, despite missing or poor image data as illustrated by FIGS. 6(c)-(f), the present framework was able to robustly determine the bounding boxes 612 and detect the imaging plane.

Additional results are shown in FIG. 7, where the images included severe imaging artifacts, missing data due poor positioning or excessive fat. In one case (see FIG. 7(c)), the menisci are completely not visible in the field-of-view. However, the present method reliably predicted the target location and orientation based on the limited information available, in the same way a human observer would do, but maybe with higher precision and consistency.

Tables 1 and 2 as shown in FIG. 13 depict the results of the present method as compared to other prior methods. These prior methods include the Lehmann's method, the Boone's method and the Improved Projection Profile method, which are respectively described in the following documents, which are herein incorporated by reference: T. M. Lehmann, O. Güld, D. Keysers, H. Schubert, M. Kohnen, and B. B. Wein, "Determining the view of chest radiographs," *Journal of Digital Imaging*, vol. 16, no. 3, pp. 280-291, 2003; J. M. Boone, G. S. Hurlock, J. A. Seibert, and R. L. Kennedy, "Automated recognition of lateral from PA chest radiographs:

saving seconds in a PACS environment," *Journal of Digital Imaging*, vol. 16, no. 4, pp. 345-349, 2003; and E. Kao, C. Lee, T. Jaw, J. Hsu, and G. Liu, "Projection profile analysis for identifying different views of chest radiographs," *Academic Radiology*, vol. 13, no. 4, pp. 518-525, 2006. Other prior methods, such as the PatchBOW+SVM method and the SIFT-BOW+SVM method, are respectively described in the following documents, which are herein incorporated by reference: T. Deselaers and H. Ney, "Deformations, patches, and discriminative models for automatic annotation of medical radiographs," *Pattern Recog. Letters*, vol. 29, no. 15, pp. 2003-2010, 2008; and T. Tommasi, F, Orabona, and B. Caputo, "Discriminative cue integration for medical image annotation," *Pattern Recog. Letters*, vol. 29, no. 15, pp. 1996-2002, 2008 ("Tomassi et al."). For most of these challenging cases, the successes of the present framework may be attributed to the extra redundancies incorporated in the method.

FIGS. 8-11 illustrate another exemplary use case in which the scan range for locating a target structure is automatically detected in CT topograms. On a test data set of 169 topograms, the detection rate varied from 98.2% to 100%, and the false detection rate varied from 0.0% to 0.5%, for different ROIs. The test was carried out on a DELL Precision 490 workstation with an Intel (R) Xeon (R). The typical execution time for the detection of multiple organ ROIs in an input image was about 1 second (on an Intel Xeon 1.86 GHz CPU with a 2 GB RAM).

Stress-testing was performed using the present framework, and the results were compared with the well-known active appearance model (AAM) approach for detecting the brain scan range in lateral topograms. See, for example, T. Cootes, G. Edwards, C. Taylor et al., "Active appearance models," *IEEE Trans. Pattern. Anal. Machine Intell.*, vol. 23, no. 6, pp. 681-685, 2001, which is herein incorporated by reference. Based on a total of 198 cases, some of which were quite challenging, the failure rates for the AAM approach and the present approach were 11.6% and 3%, respectively.

Figure 10:
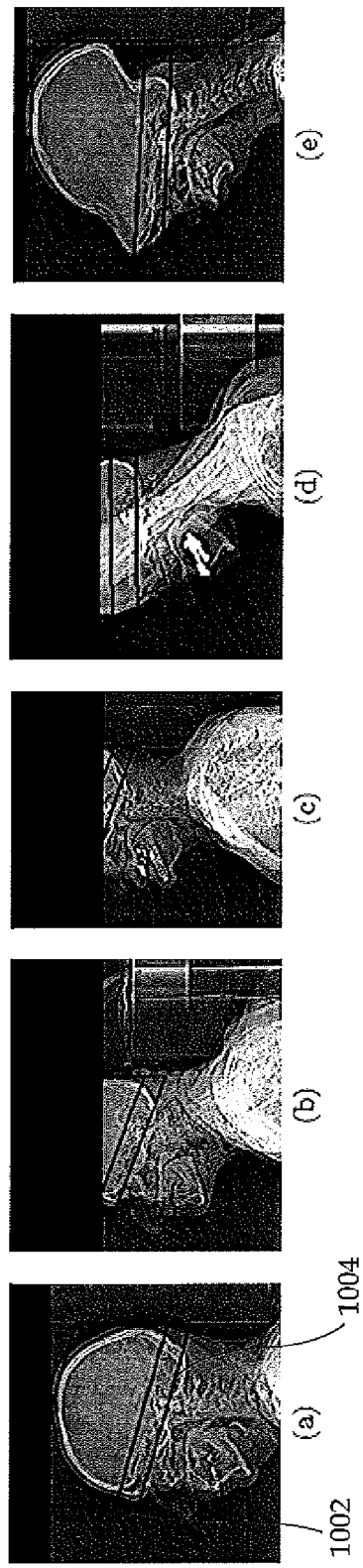
FIGS. 10(a)-(e) show exemplary detection results for head scan ranges.
Figure 11:
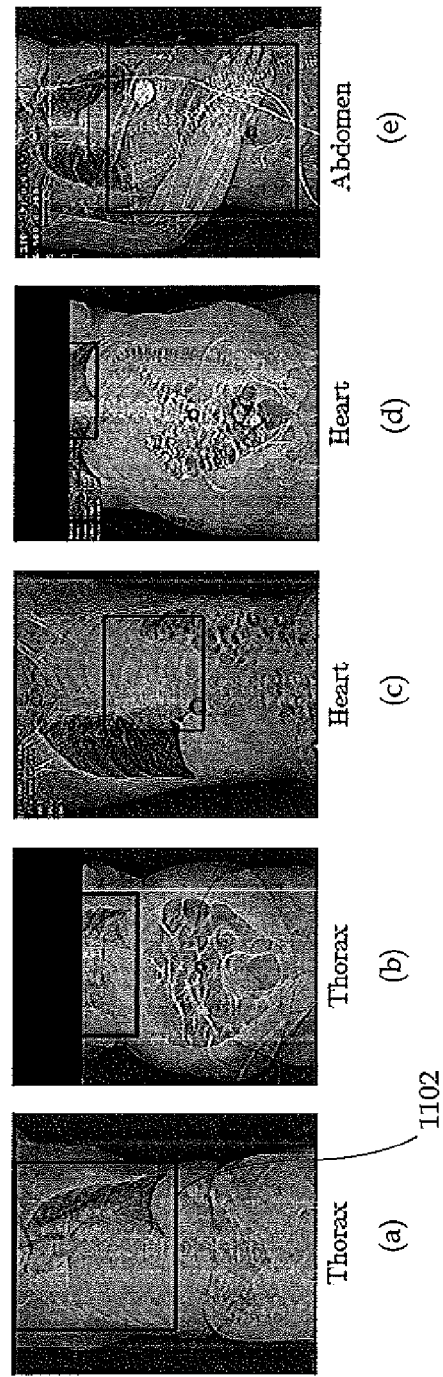
FIGS. 11(a)-(e) show exemplary detection results for scan ranges of the thorax, heart and abdomen.

FIGS. 8(*a*)-(*f*) and 9(*a*)-(*e*) show exemplary detection results for scan/reconstruction ranges 802 for the pelvis. FIGS. 10(*a*)-(*e*) show exemplary detection results for head scan ranges 1002, where the lower edge 1004 of the scan range should ideally go through the Canthomeatal line. FIGS. 11(*a*)-(*e*) show exemplary detection results for scan ranges 1102 of the thorax, heart and abdomen. As shown in many of these challenging cases, the present framework is very robust to missing data and large image variations, succeeding even in cases with 80% to 90% of the target organ out of the image (see, for example, FIG. 10(*c*)) or strong patient motion (see, for example, FIG. 10(*e*)).

Figure 12:
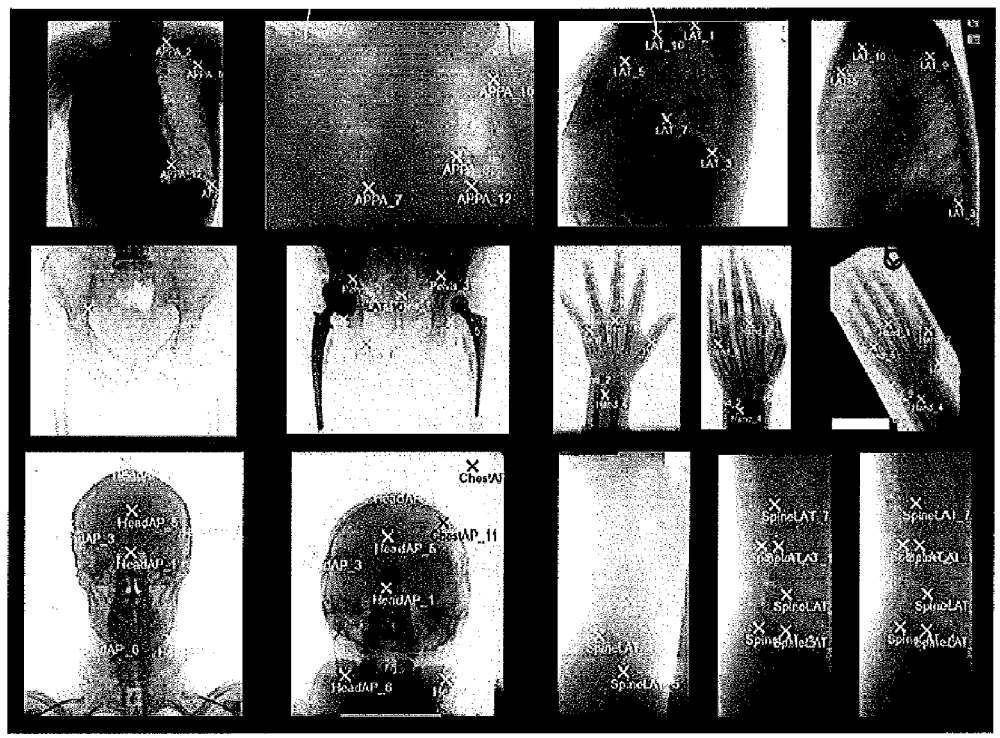
FIG. 12 illustrates an exemplary use case in which radiographs are automatically classified.

FIG. 12 illustrates another exemplary use case in which radiographs are automatically classified. In one implementation, landmarks 1202 in the images 1204 are classified and annotated or labeled (e.g., "Chest PA-AP," "Chest Lateral," "Pelvis," "Head," etc.). The present framework was evaluated based on four subtasks: PA-AP/LAT chest radiograph view identification task with and without OTHER class, and the multi-class radiograph classification task with and without OTHER class. For the former task, a database of around 1500 chest radiographs was used; for the latter task, the IRMA/ImageCLEF2008 database (http://imageclef.org/2008/medaat) containing more than 10,000 radiographs of various body regions was used. About 500 PA-AP, 500 LAT, and 500 OTHER images were randomly selected for training the foveal evidence detectors, with each using about 200-300 cases. These training images were also used for training the configuration model. The remaining images were used as the testing set.

For the chest radiograph view identification, the present method was compared with the Boone method, the Lehmann method, and the Improved Projection Profile method. For the multi-class radiograph classification task, the present method was compared with the PatchBOW+SVM method and the SIFTBOW+SVM method. With respect to the PatchBOW+SVM method, the bag-of-features approach was implemented based on randomly cropped image sub-patches. The generated bag-of-features histogram for each image had 2000 bins, which were then classified using a SVM classifier with a linear kernel. With respect to the SIFTBOW+SVM method, the same modified version of the SIFT (modSIFT) descriptor was implemented using the same parameters for extracting bag-of-features as those used by T. Tommasi et al. The 32×32 pixel intensity features and the modSIFT bag-of-features were combined as the final feature vector, while a SVM classifier with a linear kernel was used for classification. The benchmark performances were compared by directly using 32×32 pixel intensity from the down-sampled image as the feature vector along with a SVM classifier.

As shown in FIG. 12, the classification results along the detected landmarks were very robust even in the presence of severe artifacts and diseases. FIG. 13 shows Table 1 and Table 2, which compare the recognition rates of the present method along with the other methods. It can be observed that the present framework achieved an almost perfect performance on the PAAP/LAT separation task. The only failed case involved a PA-AP image of a 3-year-old baby. The present method also performed the best on the other three tasks. Therefore, it can be shown that by using redundancies, the present anatomical parsing method is able to reach very high robustness and success rate, approaching or even exceeding human performance.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

Further, although method or process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

The invention claimed is:

1. A method of computer-aided detection, comprising:
(i) receiving an input set of training images of a target structure;

(ii) spatially realigning the input set of training images to different landmarks to generate multiple bags of training images, wherein at least one of the multiple bags comprises substantially all the training images in the input set realigned to at least one of the different landmarks;

(iii) training a spatial ensemble of detectors using the multiple bags of training images; and (iv) generating an output result by using the trained spatial ensemble of detectors to automatically detect the target structure in an input image.

2. The method of claim 1 wherein the step (iv) comprises determining a presence, location, size, orientation, or combination thereof, of the target structure.

3. The method of claim 1 wherein the step (ii) comprises generating a number of the multiple bags that is more than a minimum number of landmarks required for determining a presence, location, size, orientation, or combination thereof, of the target structure.

4. The method of claim 1 wherein the step (iii) comprises performing an AdaBoost-based or random forest learning method.

5. The method of claim 1 further comprises performing consensus learning based on the spatial ensemble of detectors.

6. The method of claim 5 wherein the performing the consensus learning comprises performing majority voting to detect the target structure.

7. The method of claim 5 wherein the performing the consensus learning comprises generating one or more sparse configuration models by implementing a sparse voting scheme to detect any outliers.

8. The method of claim 7 wherein the sparse voting scheme comprises determining a vote received by a landmark point from a sparse set of landmarks points based on a conditional distribution estimated using the input set of training images.

9. The method of claim 7 wherein the sparse voting scheme is applied on or around the target structure.

10. The method of claim 7 wherein the sparse voting scheme is applied on a distal structure away from the target structure.

11. The method of claim 1 wherein the step (iii) comprises training the spatial ensemble of detectors at multiple scales ranging from a coarse level to a fine level.

12. The method of claim 1 wherein the step (iv) comprises determining a presence, location, size, orientation, or combination thereof, of the target structure.

13. The method of claim 1 wherein the step (iv) comprises predicting an imaging plane that is aligned for optimal visualization of at least a portion of the target structure in the input image.

14. The method of claim 1 wherein the step (iv) comprises predicting a two-dimensional or three-dimensional field of view for locating or imaging at least a portion of the target structure in the input image.

15. The method of claim 14 wherein the field of view is stationary or moving in time to align with any motion.

16. The method of claim 1 wherein the step (iv) comprises classifying and annotating at least a portion of the target structure in the input image.

17. The method of claim 1 further comprises generating a measure of reliability based on the output result.

18. A non-transitory computer readable medium embodying a program of instructions executable by machine to perform steps for computer-aided detection, the steps comprising:

(i) receiving an input set of training images of a target structure;

(ii) spatially realigning the input set of training images to different landmarks to generate multiple bags of training images, wherein at least one of the multiple bags comprises substantially all the training images in the input set realigned to at least one of the different landmarks;

(iii) training a spatial ensemble of detectors using the multiple bags of training images; and (iv) generating an output result by using the trained spatial ensemble of detectors to automatically detect the target structure in an input image.

19. A computer-aided detection system, comprising:

a non-transitory memory device for storing computer readable program code; and a processor in communication with the memory device, the processor being operative with the computer readable program code to:

(i) receive an input set of training images of a target structure;

(ii) spatially realign the input set of training images to different landmarks to generate multiple bags of training images, wherein at least one of the multiple bags comprises substantially all the training images in the input set realigned to at least one of the different landmarks;

(iii) train a spatial ensemble of detectors using the multiple bags of training images; and (iv) generate an output result by using the trained spatial ensemble of detectors to automatically detect the target structure in an input image.

* * * * *